(12) United States Patent
Lee

(10) Patent No.: US 8,366,164 B2
(45) Date of Patent: Feb. 5, 2013

(54) DRAG-IT-EASY

(76) Inventor: Koua Lee, St. Paul, MN (US)

( * ) Notice: Subject to any disclaimer, the term of this patent is extended or adjusted under 35 U.S.C. 154(b) by 411 days.

(21) Appl. No.: 12/587,881

(22) Filed: Oct. 15, 2009

(65) Prior Publication Data

US 2011/0089710 A1    Apr. 21, 2011

(51) Int. Cl.
*B65G 7/00* (2006.01)
(52) U.S. Cl. ......................... 294/150; 294/153
(58) Field of Classification Search .................. 294/142, 294/149, 150, 153, 154, 156, 157, 165
See application file for complete search history.

(56) References Cited

U.S. PATENT DOCUMENTS

| | | | | |
|---|---|---|---|---|
| 4,586,745 A * | 5/1986 | Shepard | ......................... | 294/150 |
| D312,164 S * | 11/1990 | Pierotti | ......................... | D34/28 |
| 5,131,707 A * | 7/1992 | Zazzara et al. | ................ | 294/156 |
| 6,089,636 A * | 7/2000 | Harris | ........................... | 294/150 |
| 6,457,763 B2 * | 10/2002 | Cornelius | ..................... | 294/153 |
| 6,755,454 B1 * | 6/2004 | Cary | .............................. | 294/150 |
| 7,118,149 B1 * | 10/2006 | Mertz, Jr. | ....................... | 294/152 |
| 2007/0296232 A1 * | 12/2007 | Elder | ........................... | 294/157 |

* cited by examiner

*Primary Examiner* — Dean Kramer
(74) *Attorney, Agent, or Firm* — Merchant & Gould P.C.

(57) ABSTRACT

An animal dragging method for the purpose of dragging or carrying game animal carcasses from one point to another. The method consists of one strap weaved through two holes on each end of a cylinder pipe. This pipe serves as a handle opposite the knotted strap convenient for holstering game animals. The pendulum-looking device allows for simple maneuvering when hooked onto the ankle(s) or neck(s) of a game animal(s). The knotted strap weaved through the cylinder pipe also allows for adjustment; depending on the size of the game animal it can hold up to several game animals.

4 Claims, 22 Drawing Sheets

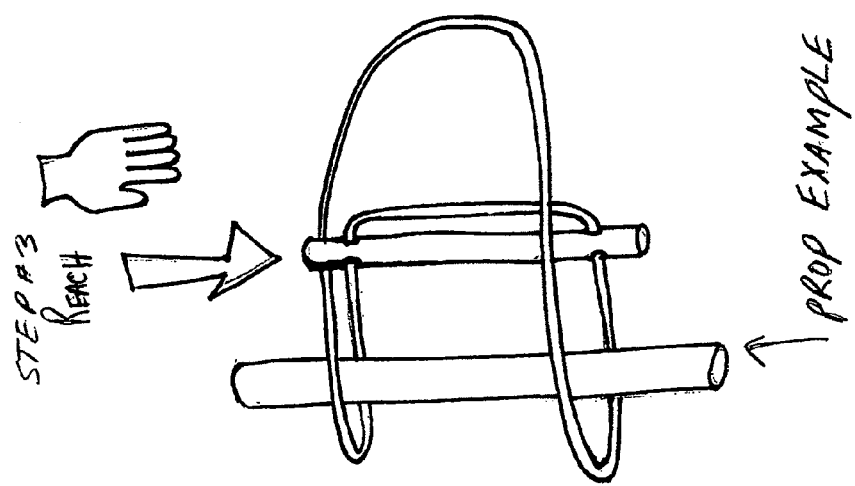

DRAG-IT-EASY

BACKGROUND OF INVENTION

1. Field of the Invention

The invention presented relates to the mounting and dragging of game animal.

2. Description of Related Art

For the purpose of hunting and game dragging a device is needed for mounting and dragging game animal from one location to another. Prior inventions have simply allowed for basic transporting of game animal, most commonly from the antlers or by the neck. There is still a need for a more methodical approach to mount game by the legs, or the body and to cut the distance between the carcass and dragger to allow for better maneuvering of the carcass. Moreover, previous inventions lack an effective way to drag game animal through rough terrain and or difficult environments such as brushes or debris.

These issues are the main reasons why an invention is needed to improve efficiency of mounting, and to improve smooth transport of game dragging.

BRIEF SUMMARY OF INVENTION

The present invention is a wild game tool possibly small in size and weight. It successfully allows for better mounting and dragging of game animal. The objective of this invention is to improve the action of mounting and dragging game animals. This device will cut time in half by securing the game closer to the dragger which allows for better distribution of strength to drag a game animal(s). This invention also produces a method allowing better maneuvering of game animal through rough terrain. Easy mounting strategies will allot for several game animals to be hoisted at once and simple holstering of game animal body parts. The invention simply includes one draft strap weaved through two small holes on each end of a cylinder pipe, then knotted. This pendulum-looking device provides versatility. The handle ensures adequate room for a strong grasp of the mounted game animal, and the knotted strap (which can slide back and forth) provides flexibility in size and number of game animals mounted. Thus, this hefty device meets the needs of transport as well as security of game animal.

BRIEF DESCRIPTION OF THE DRAWINGS

In reference to the drawing on FIG. 1, the present invention shows the properties of the design which consists of a draft rope interlaced through a cylinder tube and knotted. This device can be large or small in size and the weight can be adjusted for length. This cylinder tube can be made out of any material so long as it has two identical holes drilled through the cylinder tube. A set of holes on each end allows the strap to pass through the tube (refer to FIG. 1). The strap can be of any material (nylon, rope, etc.) so long as it is durable and can be knotted together to make one continuous rope.

The steps for using the drag tool can be understood by examining STEPS 1-5 as shown in FIGS. 2A-2E with a prop example. STEP 1 (FIG. 2A) is the standard position for the drag tool with the prop example. In STEP 2 (FIG. 2B), the tool clearly shows the rope being pulled over prop example and it must completely clear the cylinder tube. In STEP 3 (FIG. 2C), reach and pull the cylinder cylinder handle up through the rope that is pulled over the prop example. STEPS 4 (FIG. 2D) and 5 (FIG. 2E) show the cylinder handle being pulled up as the rope tightens around the prop example. In STEP 5, the tool clearly shows a secure grasp of the prop example, again this prop example represents the hock, leg, antler or neck of a game animal carcass.

Examples of the use of this dragging tool can be seen in FIGS. 3-12.

The dragging tool not only functions in STEPS 1-5 (FIGS. 2A-2E) it can also function differently as shown in the ALTERNATIVE STEPS 1-6 (FIGS. 13A-13F). These ALT STEPS show how the dragging tool can function with a closer grip of the game animal and how it can provide holstering options.

In ATL STEP 1 (FIG. 13A), we see the basic drag tool, this tool method shows the cylinder centered between the knotted rope. The two ends allow for a better grasp of game animal. ALT STEP 1 shows two prop examples over the rope. In ALT STEP 2 (FIG. 13B), the rope is pulled up and over prop example #2. In ALT STEP 3, (FIG. 13C), the same is done to the other side with the rope pulled up and over prop example 1. In the ALT STEP 4 (FIG. 13D), the cylinder handle is then pulled up and out from underneath the rope. In ALT STEP 5 (FIG. 13E) you see the cylinder handle being pulled to show movement; as the handle moves upwards, the prop examples are moving closer together for a tighter grasp. In ALT STEP 6 (FIG. 13F), the finished function of the drag tool shows how this drag tool can tightly secure game animal at a closer distance. Best method for holstering game animals.

Figure 1:
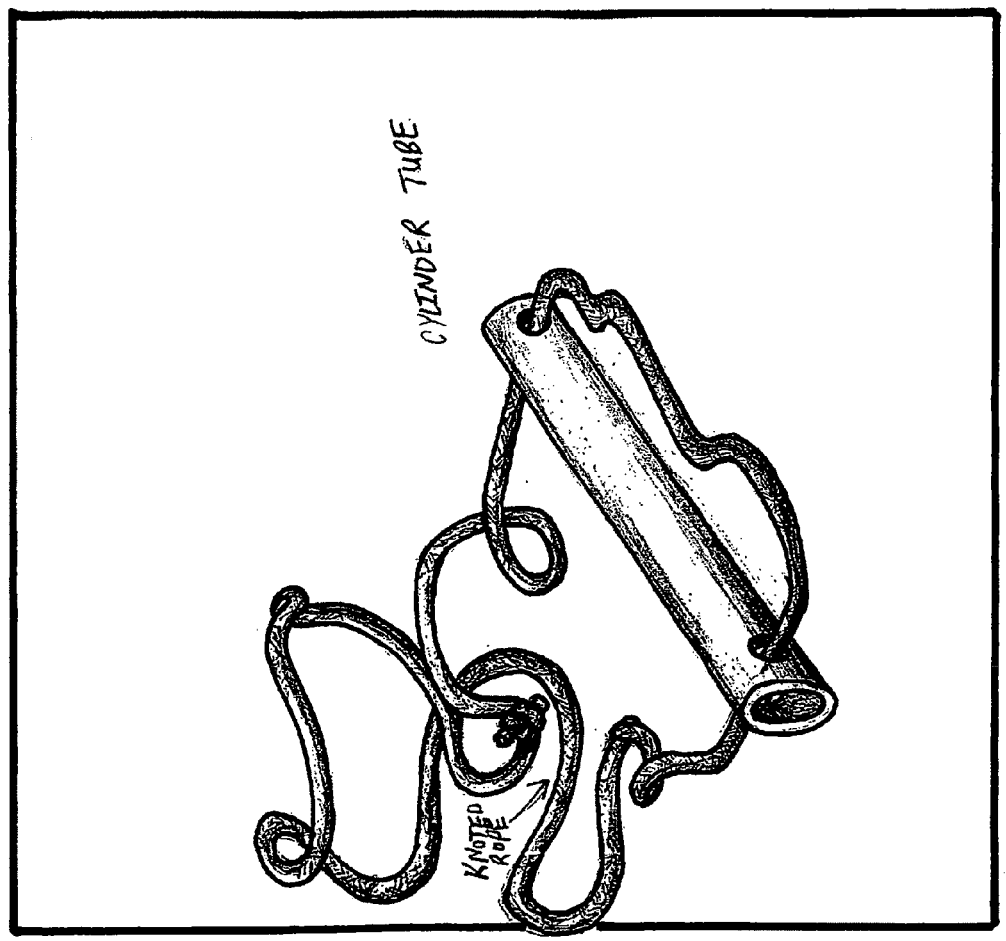
Figure 2A:
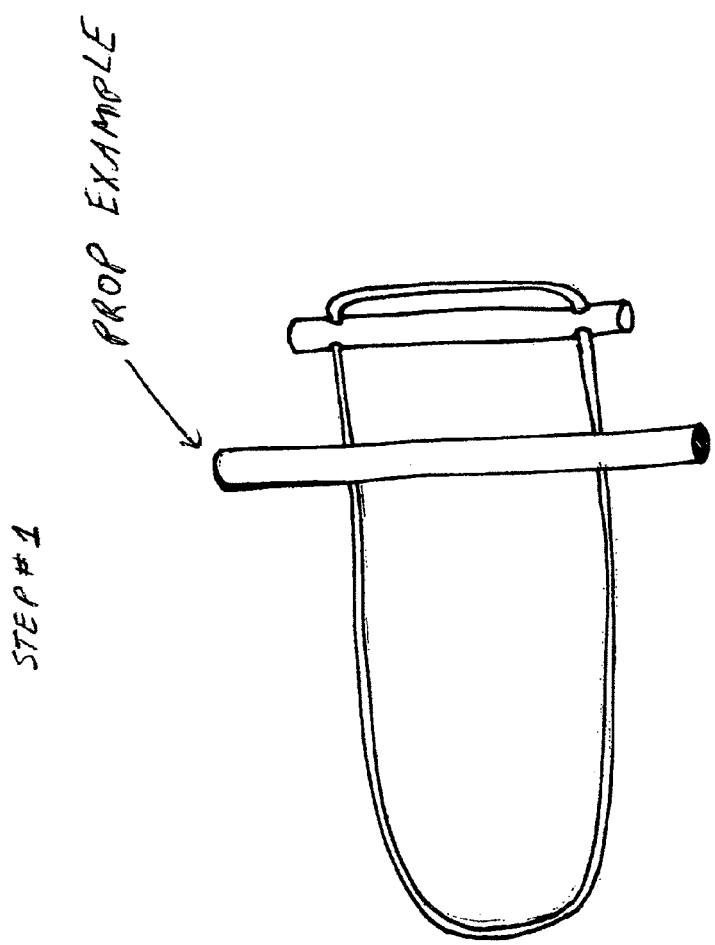
Figure 2B:
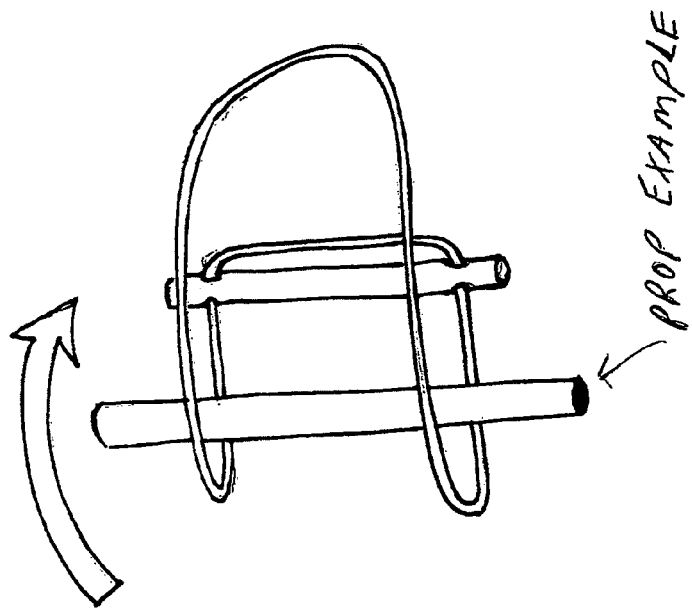
Figure 2D:
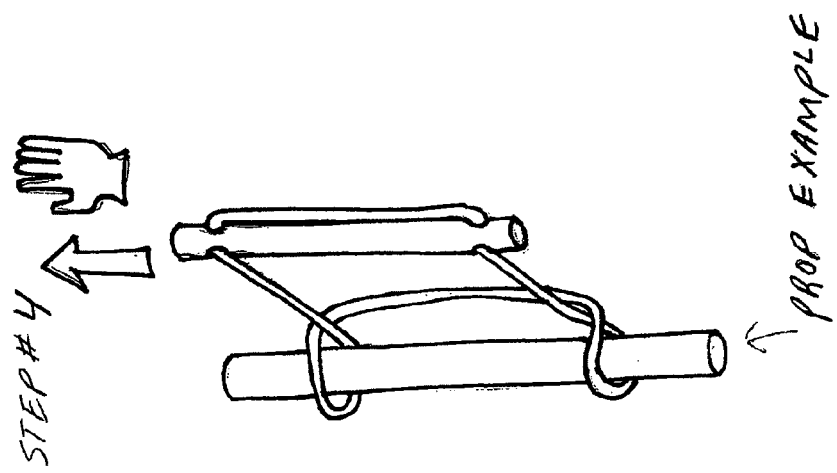
Figure 2E:
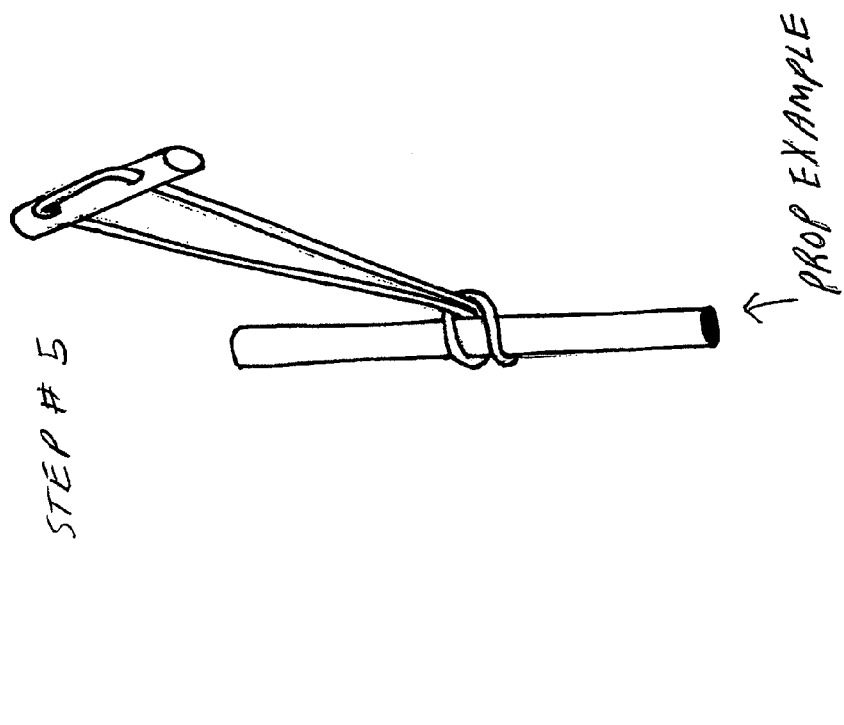
Figure 3:
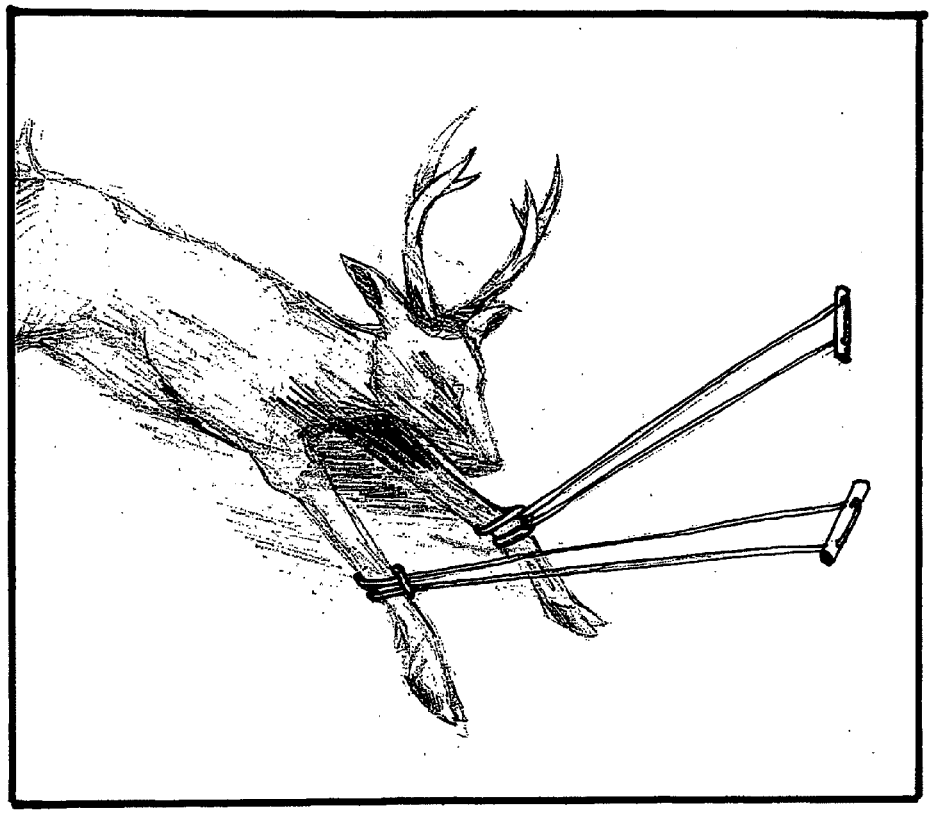
In FIG. 3, you see the tool dragging the knuckles of a deer. In the drawing, two dragging devices are used, one for each knuckle, providing better leverage and security of the game animal. This same method can be used on the antlers of a deer or game animal.
Figure 4:
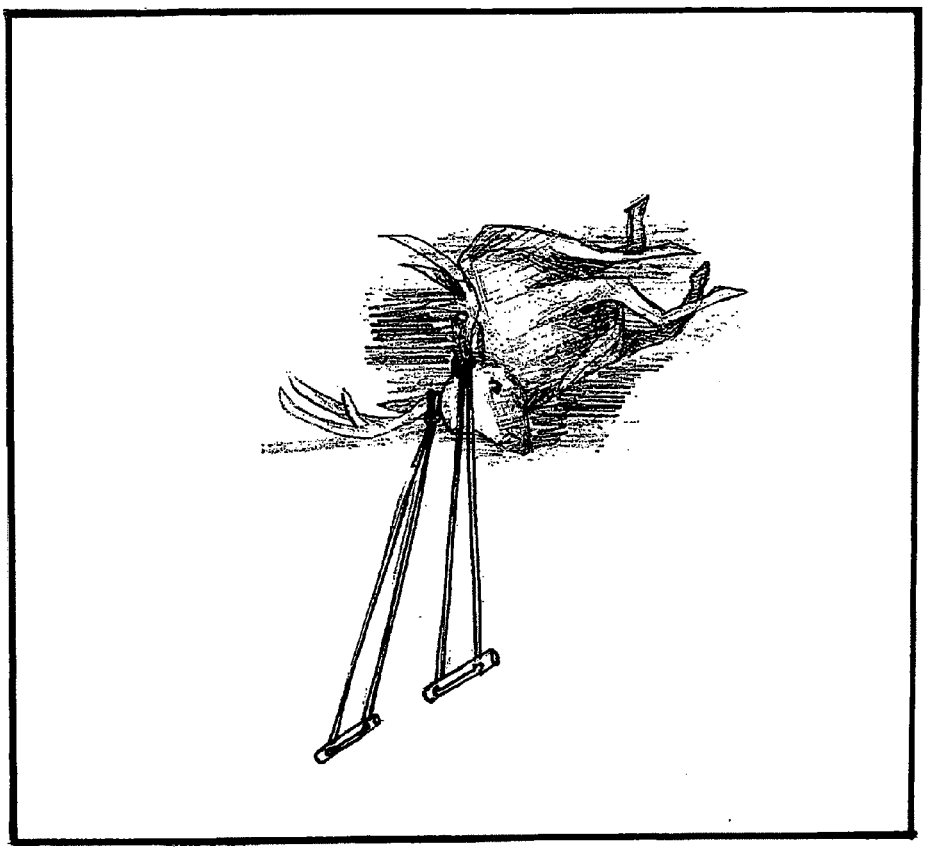
In FIG. 4, two separate dragging tools are used on the antlers of a deer showing the common use and purpose of this tool.
Figure 5:
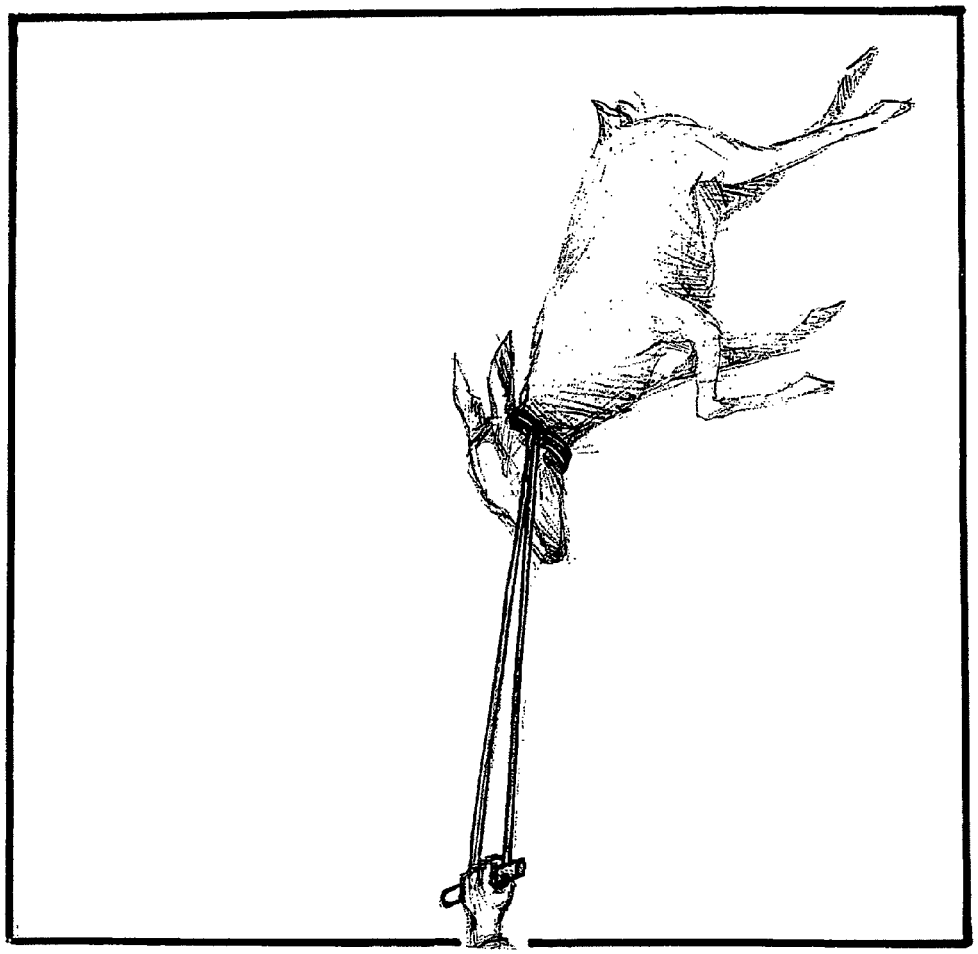
In FIG. 5, the dragging tool is used around the neck of a doe or fawn or game animals with no antlers. This shows the versatility of the product, which can accommodate any part of the game animal, large or small, antler or no antler. Each method seen here shows the same basic and simple procedure of using the dragging tool as shown and mentioned in FIG. 1 and in STEPS 1-5 (FIGS. 2A-2E).
Figure 6:
In FIG. 6, the dragging tool clearly shows the product can be used by more than one individual. As shown, each individual is using a separate drag tool on the same game animal. Each tool used here is the exact same tool with the exact same method.
Figure 7:
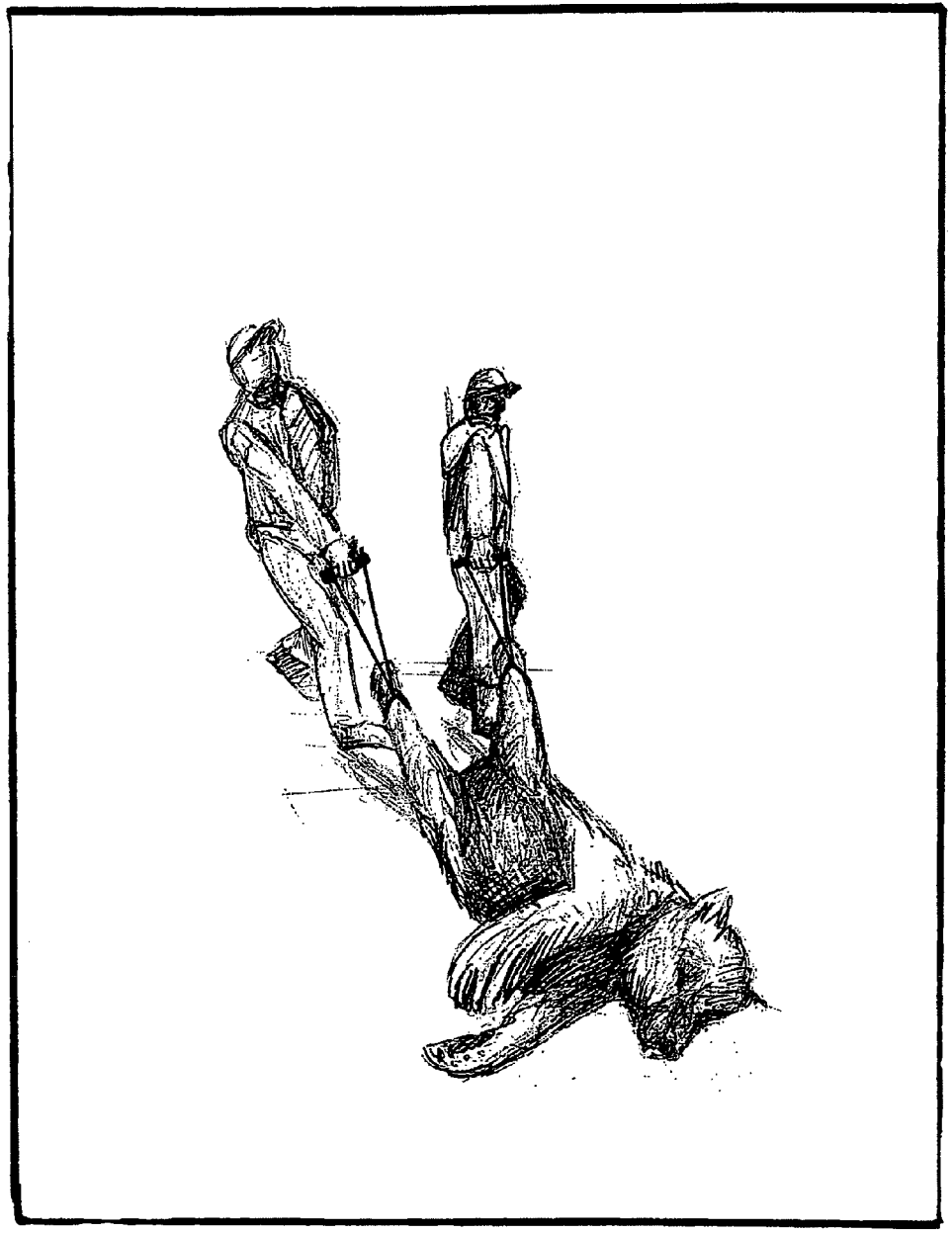
In FIGS. 7 and 8, the tool is used on a larger hunting animal such as a bear. The same method is used here with the same mounting and dragging system the tool provides.
Figure 8:
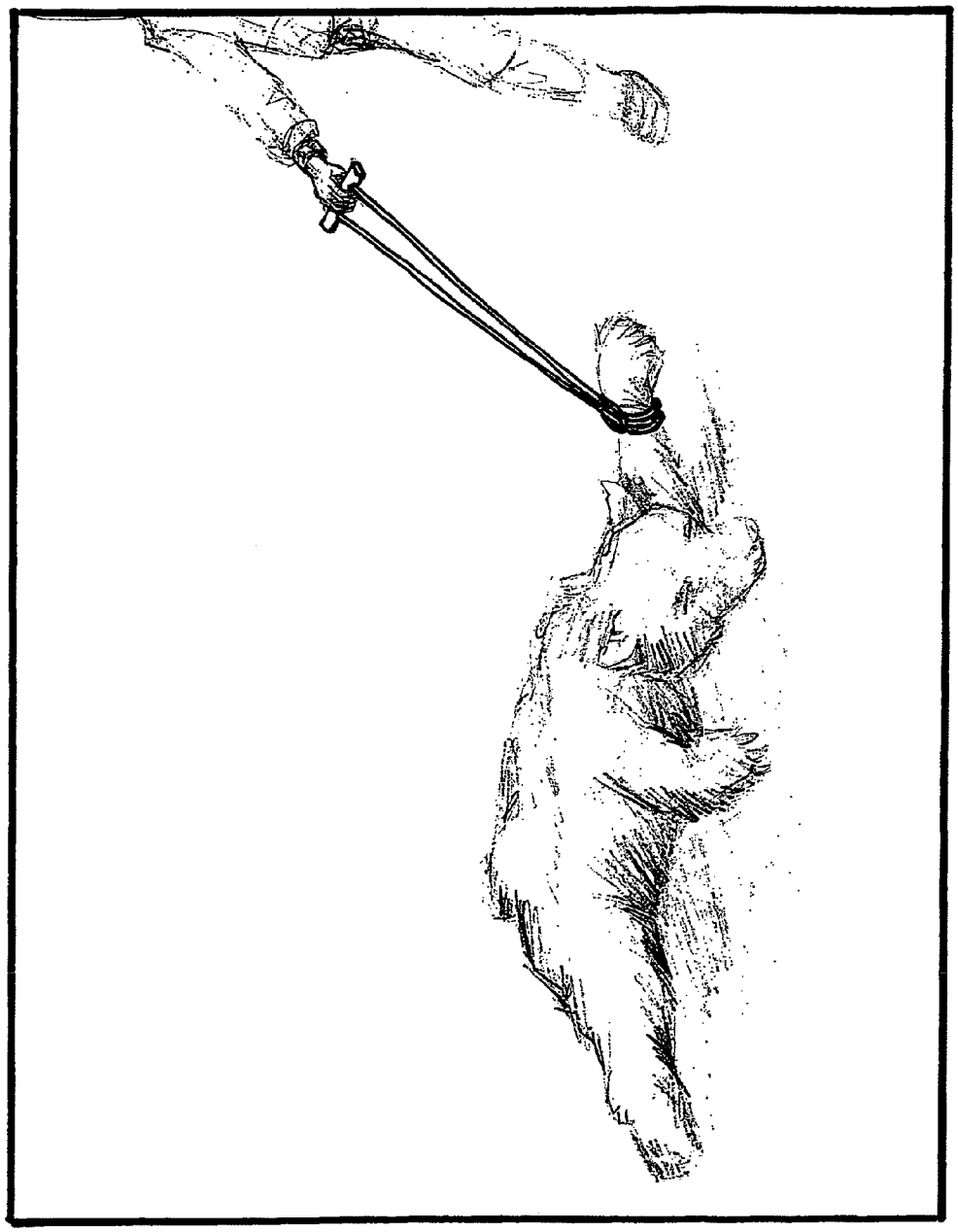
Figure 9:
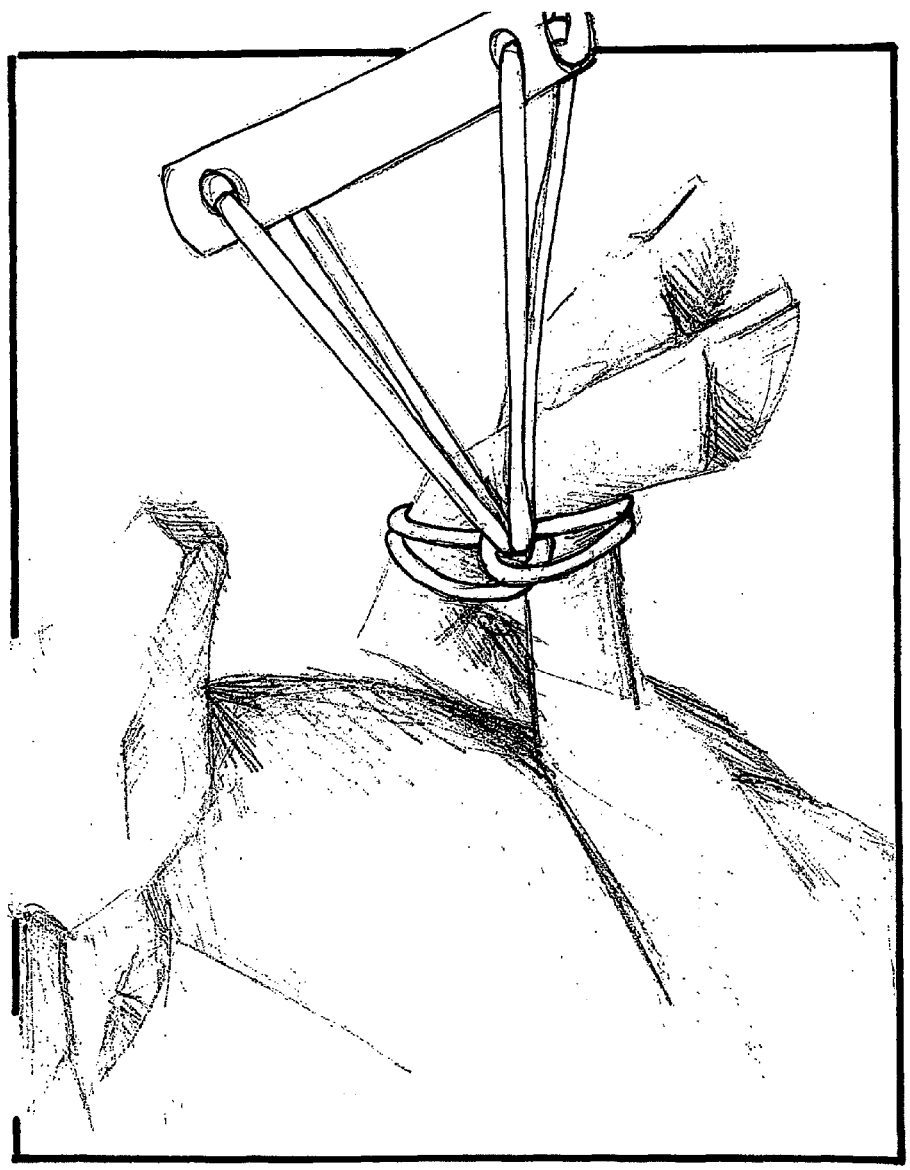
Figure 10:
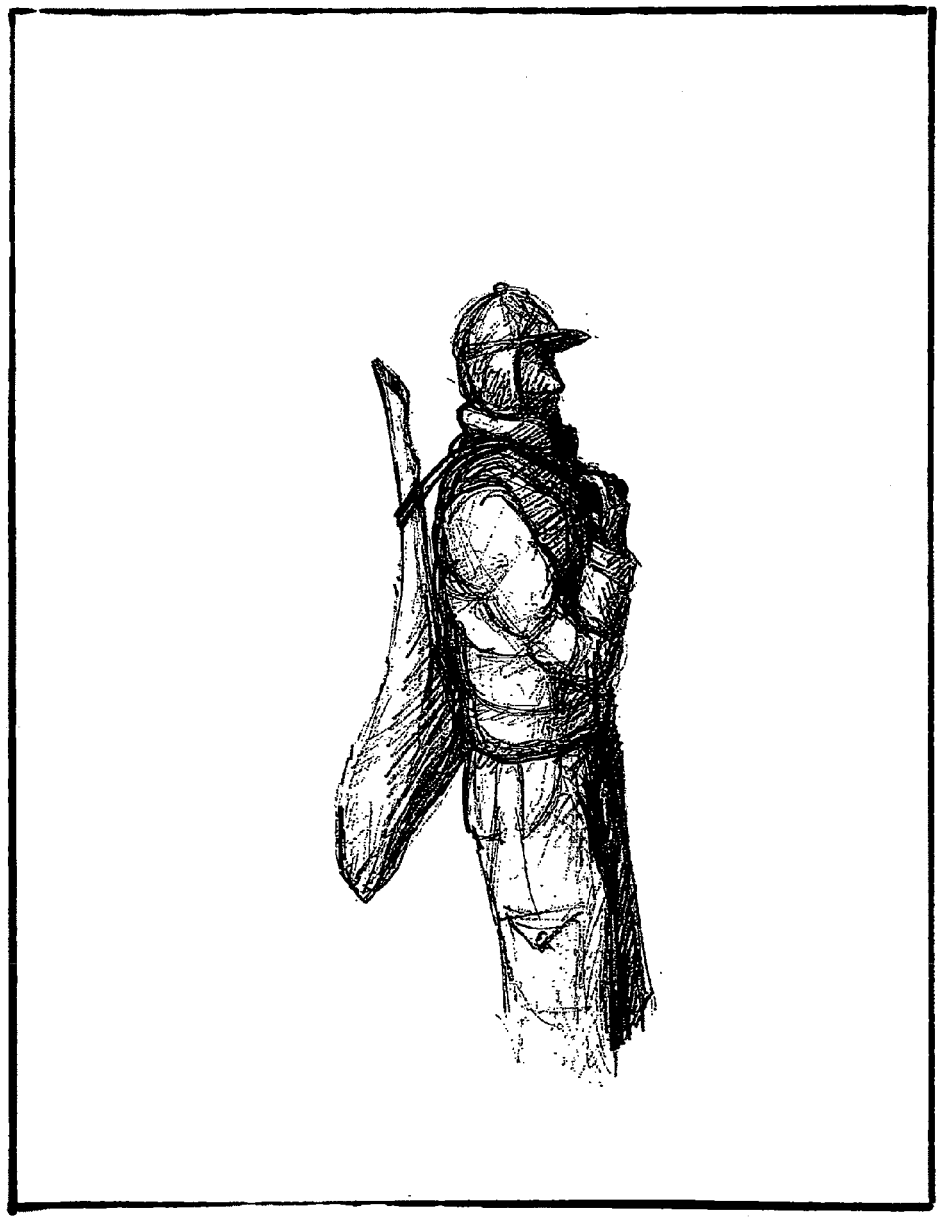

We can see the use of this method in FIGS. 9 and 10 for deer. In FIG. 9, the drag tool is securing both knuckles of a deer. This valuable function provides a shorter distance from carcass to hunter and provides better grasp of game animal mainly for purpose of holstering and or maneuvering. This tool method is ideal when maneuvering game animal through rough terrain because it provides solid leverage of the carcass and sufficient distribution of strength when holstering and or dragging.

In FIG. 10, we see a versatile purpose to the drag tool. It can also allow holstering and mounting of game animal by quartering game animal and securing parts to the drag tool. Other drag tools exist providing the same function, however this dragging also provides this function.

Figure 11:
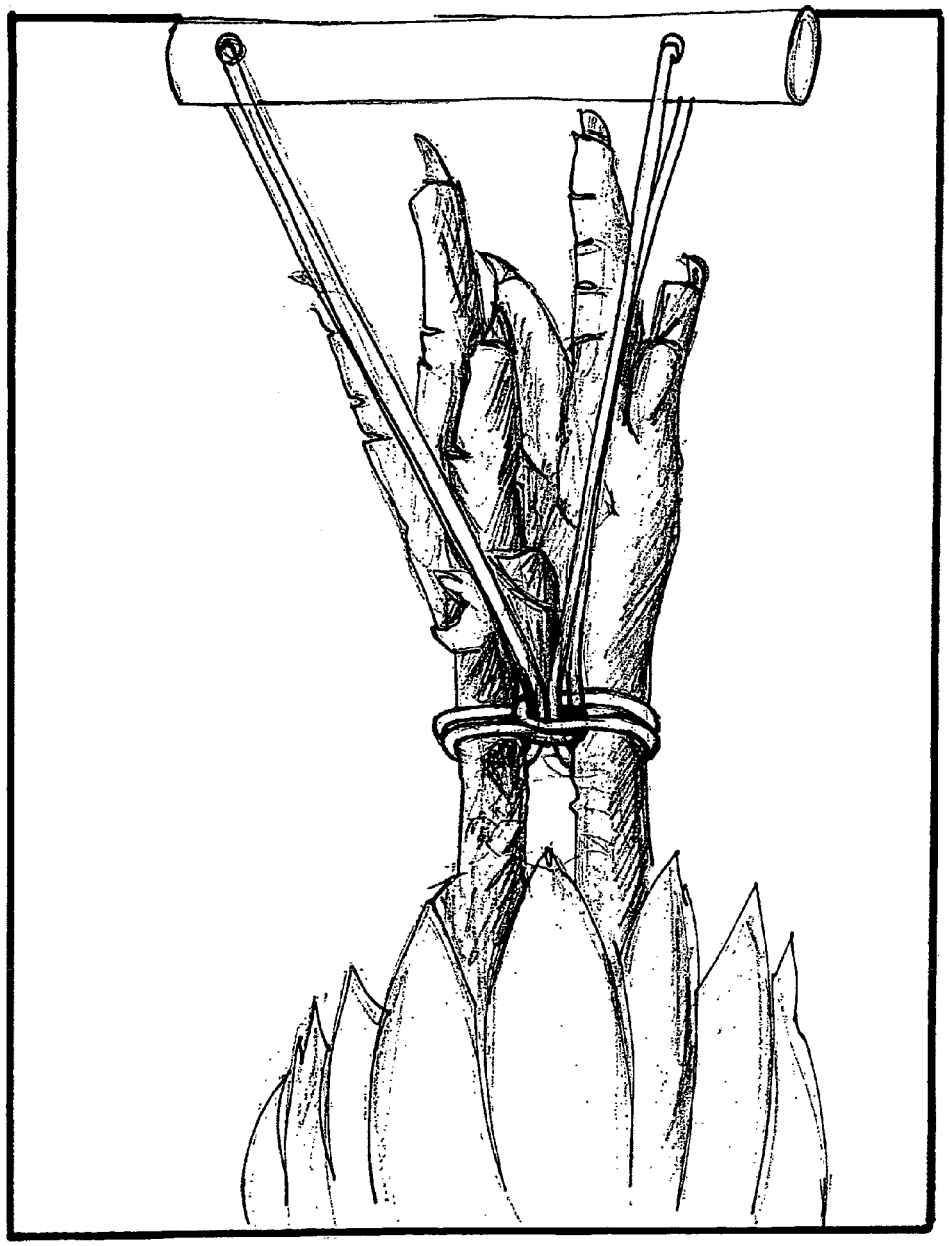
Figure 12:
Figure 13A:
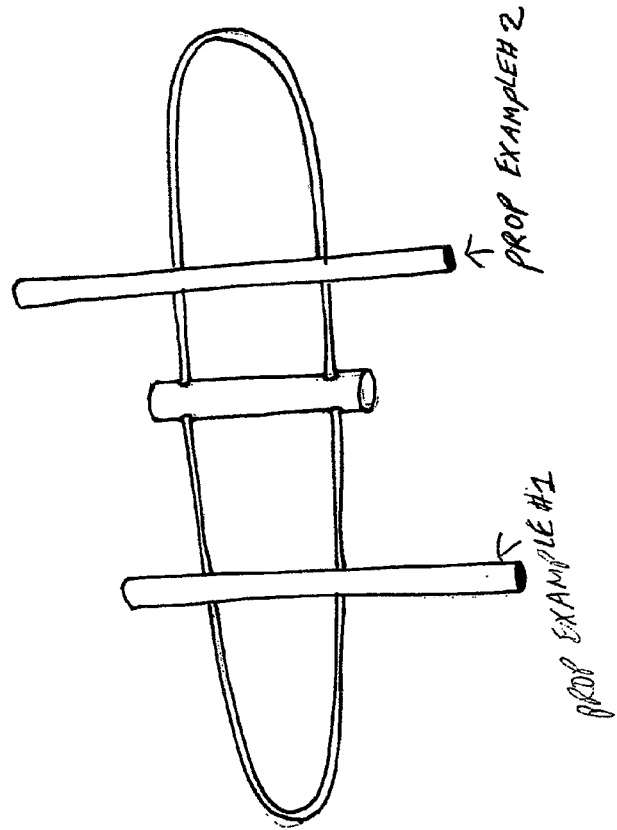
Figure 13B:
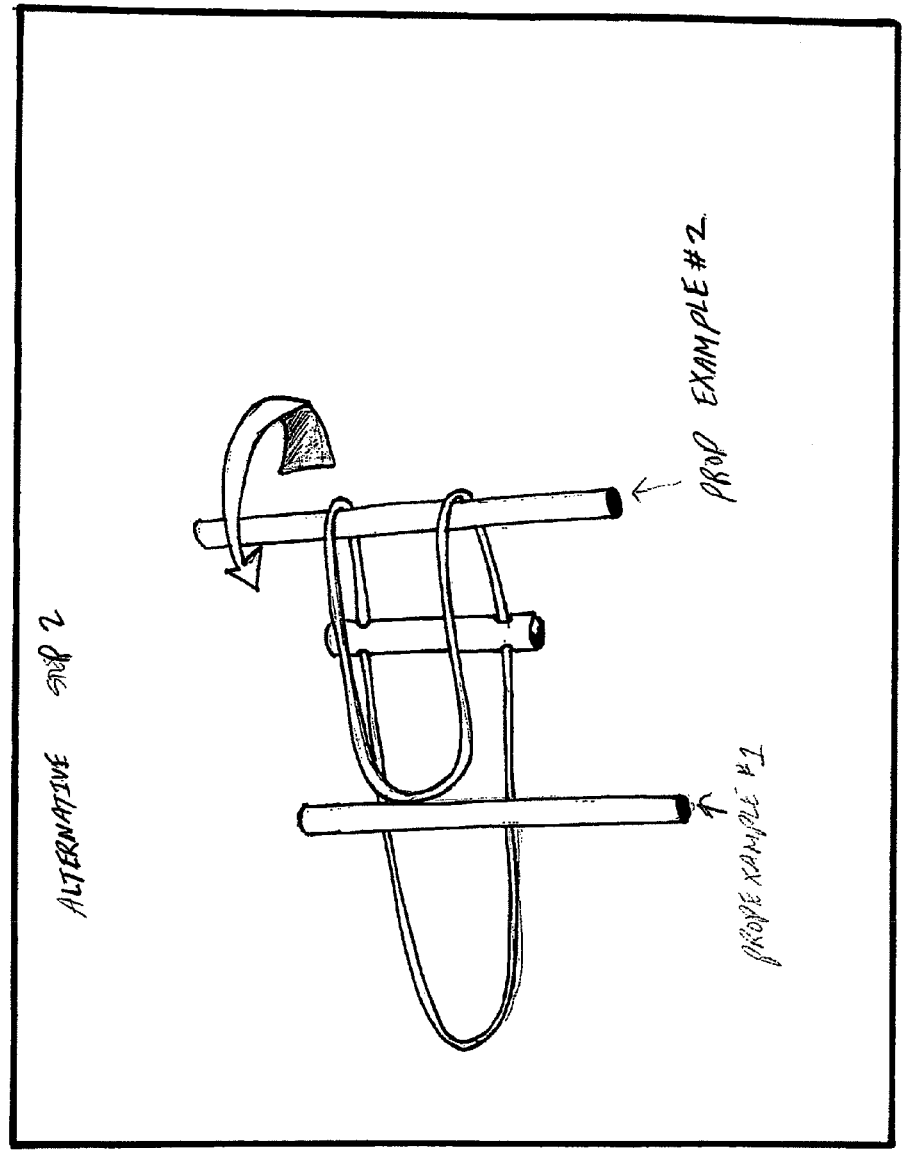
Figure 13C:
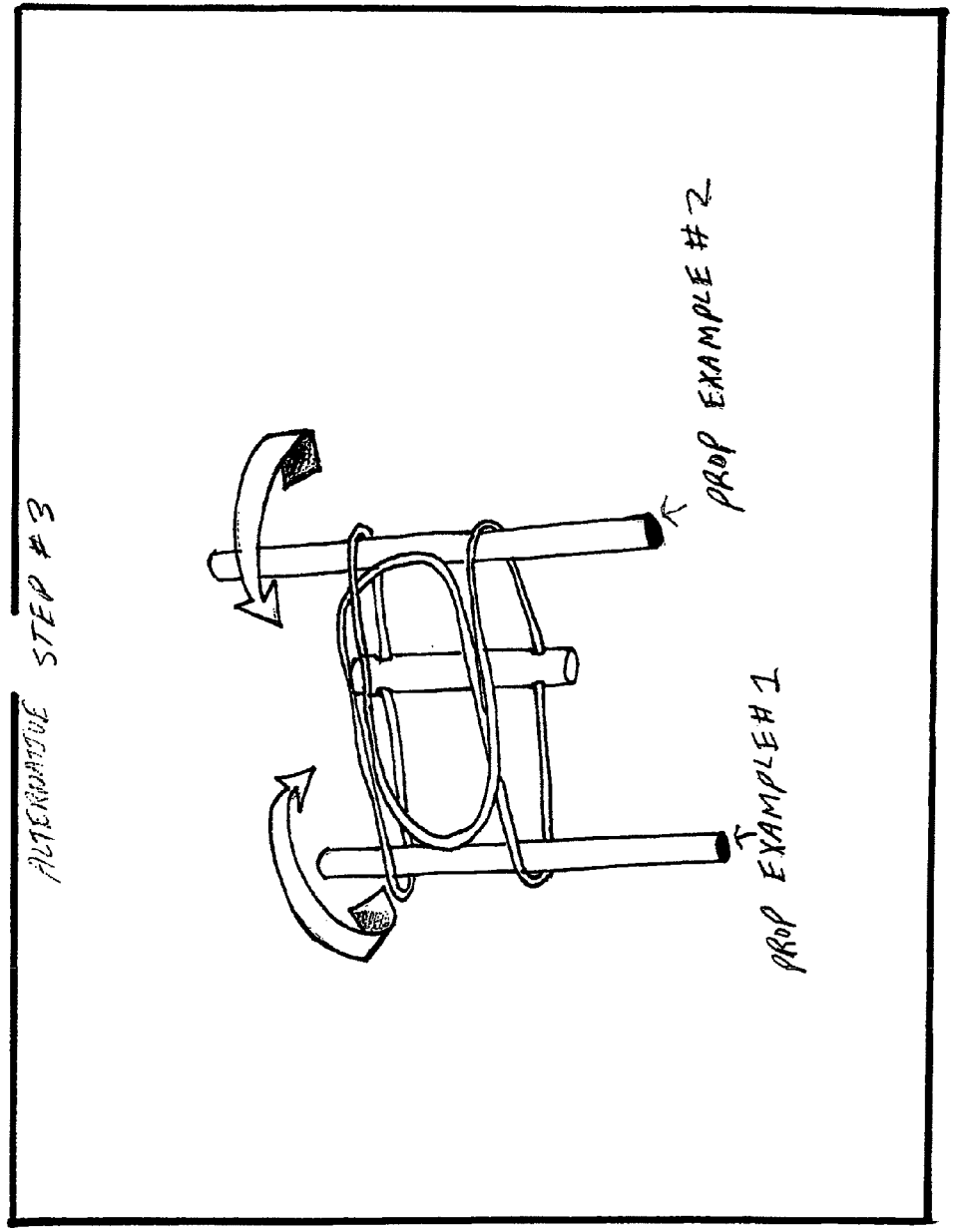
Figure 13D:
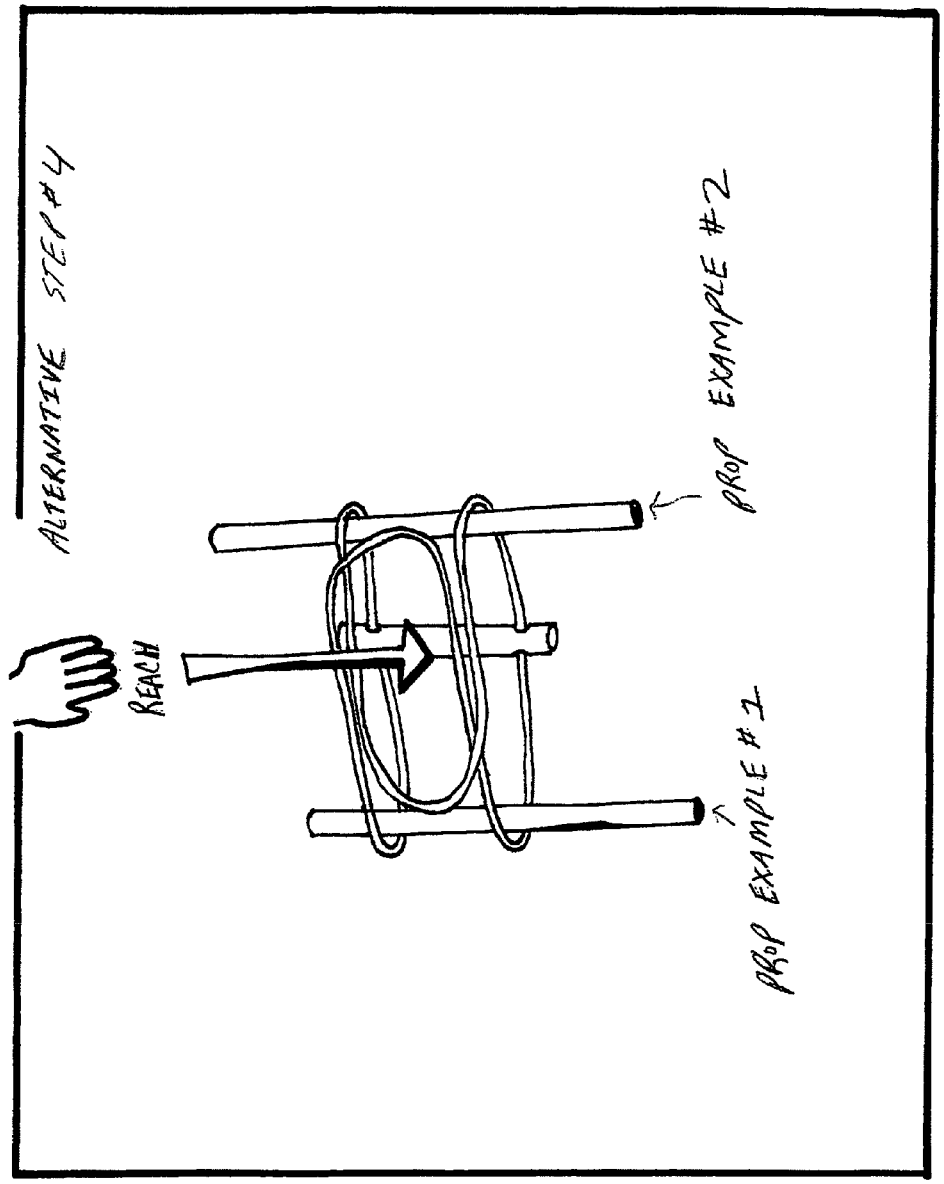
Figure 13E:
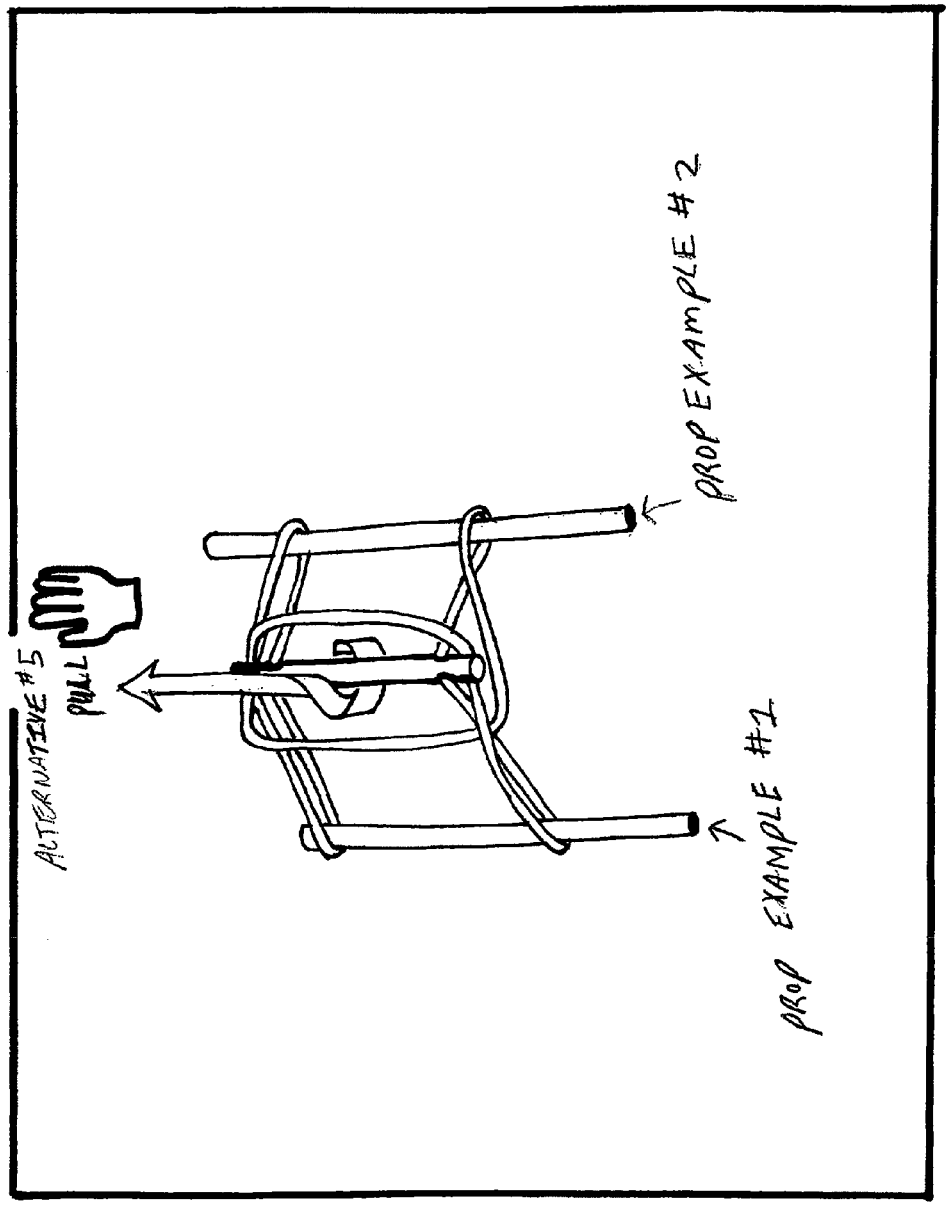
Figure 13F:
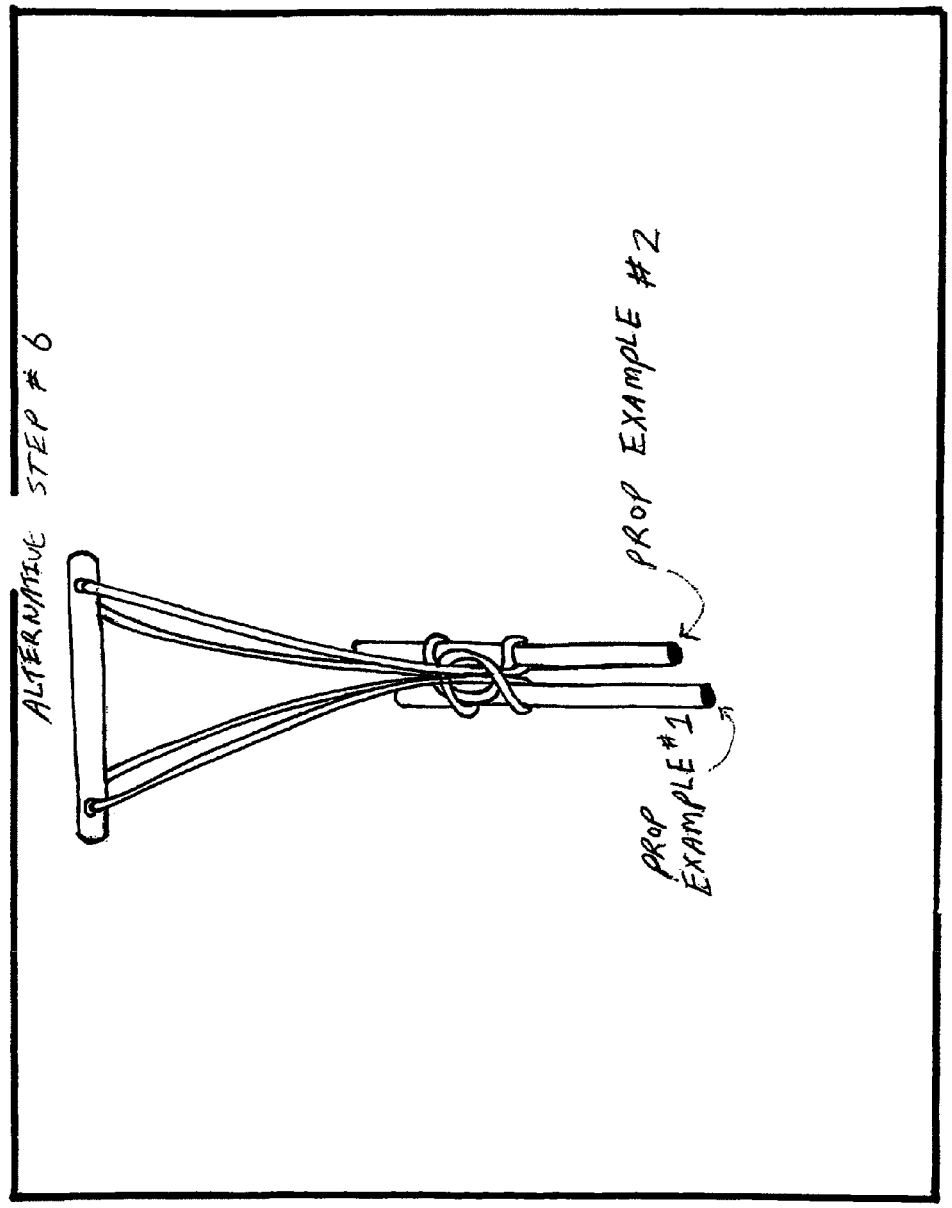

We see this versatility in FIGS. 11 and 12 as well. The drag tool can be used on game birds—using the same methods as mentioned above. By holstering and dragging the legs of a game bird.

The invention claimed is:

1. A method of securing an animal or a body part of an animal for moving the animal or body part over terrain comprising: using an apparatus comprising: a hollow cylinder tube with a cylindrical hole of the same size and shape formed between a top of the tube to a bottom of the tube on each end of the tube; and a strap with two free ends, one or both free ends of the strap passed through each hole and along the exterior of the cylindrical tube and the free ends of the strap knotted together to form a continuous loop in a method comprising:

pulling the continuous loop through the holes until the cylindrical tube is approximately in the center of the continuous loop to form a first and second loop;

wrapping both the first and second loop distal to the cylinder around the body part;

aligning the first and second loop so that they are on top of one another; and pulling the cylinder tube through the first and second loop and upwards to secure the strap to the animal or body part of the animal.

2. A method of securing an animal or a body part of an animal for moving the animal or body part over terrain comprising:

using an apparatus comprising:

a hollow cylinder tube with a cylindrical hole of the same size and shape formed between a top of the tube to a bottom of the tube on each end of the tube; and a strap with two free ends, one or both free ends of the strap passed through each hole and along the exterior of the cylindrical tube and the free ends of the strap knotted together to form a continuous loop in a method comprising:

pulling the continuous loop through the holes until the cylindrical tube is approximately in the center of the continuous loop to form a first and second loop;

wrapping a distal end of the first loop around a first animal or body part of an animal and pulling the distal end of the first loop past the cylinder tube;

wrapping a distal end of the second loop around a second animal or body part of an animal and pulling the distal end of the second loop past the cylinder tube and over the first loop; and pulling the cylinder tube through the first and second loop and upwards to secure the strap to the first and second animal or body parts of the animal.

3. The method of claim 2, wherein the first or second body part is selected from the group consisting of a leg, an antler, a knuckle, a hock, a neck and combinations thereof.

4. The method of claim 2, further comprising:

using one or more additional apparatus comprising:

a hollow cylinder tube with a cylindrical hole of the same size and shape formed between a top of the tube to a bottom of the tube on each end of the tube; and a strap with two free ends, one or both free ends of the strap passed through each hole and along the exterior of the cylindrical tube and the free ends of the strap knotted together to form a continuous loop in a method comprising:

pulling the continuous loop through the holes until the cylindrical tube is approximately in the center of the continuous loop to form a first and second loop of each additional apparatus;

wrapping a distal end of the first loop around a first animal or body part of an animal and pulling the distal end of the first loop past the cylinder tube of each additional apparatus, each additional apparatus wrapped around a different body part;

wrapping a distal end of the second loop around a second animal or body part of an animal and pulling the distal end of the second loop past the cylinder tube and over the first loop of each additional apparatus; and pulling the cylinder tube through the first and second loop of each additional apparatus and upwards to secure the strap to the first and second animal or body parts of the animal.

* * * * *